(12) United States Patent
Bouchard et al.

(10) Patent No.: US 11,674,609 B2
(45) Date of Patent: Jun. 13, 2023

(54) BACKFLOW PREVENTION ASSEMBLY WITH TELESCOPING BIAS ASSEMBLY AND REVERSIBLE VALVE MEMBER

(71) Applicant: Watts Regulator Co., North Andover, MA (US)

(72) Inventors: Peter P. Bouchard, Ayer, MA (US); Tyler Chase, Boscawen, NH (US); David Michaud, Lawrence, MA (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 17/402,737

(22) Filed: Aug. 16, 2021

(65) Prior Publication Data

US 2022/0049781 A1 Feb. 17, 2022

Related U.S. Application Data

(60) Provisional application No. 63/066,411, filed on Aug. 17, 2020.

(51) Int. Cl.
*F16K 15/06* (2006.01)
*F16K 17/30* (2006.01)
(Continued)

(52) U.S. Cl.
CPC ............ *F16K 15/066* (2013.01); *E03C 1/106* (2013.01); *E03F 7/04* (2013.01); *F16K 17/30* (2013.01);
(Continued)

(58) Field of Classification Search
CPC ........ F16F 2230/32; F16F 1/122; F16F 1/125; F16F 2230/14; F16F 2230/0005;
(Continued)

(56) References Cited

U.S. PATENT DOCUMENTS 213,394 A 3/1879 Cornwal
623,418 A * 4/1899 O'Meara ................... F16K 1/42
137/329.02

(Continued)

FOREIGN PATENT DOCUMENTS

CN 110081212 A 8/2019
DE 1925477 U 12/1970
(Continued)

OTHER PUBLICATIONS

Lead Free Master Series LF870V product specifications pages, ES-F-LF-870V 1826, 2018, 4 pages.
(Continued)

*Primary Examiner* — Jessica Cahill
(74) *Attorney, Agent, or Firm* — Day Pitney LLP; George N. Chaclas

(57) ABSTRACT

A valve assembly with a spring retention assembly including an elongated cylinder portion having an open threaded end and a closed end and an elongated piston portion having a free end and a threaded tab end configured to thread through the open threaded end and, thereby, be slideably captured in the cylinder portion. A spring couples to the body portion and the piston portion to provide a force to urge the body portion and the piston away from one another, wherein the closed end and the free end are similarly shaped so that the spring retention assembly can be reversibly mounted to a valve member that can also be reversibly mounted.

12 Claims, 13 Drawing Sheets

(51) Int. Cl.
  *F16K 27/02* (2006.01)
  *F16K 27/12* (2006.01)
  *F16K 37/00* (2006.01)
  *E03F 7/04* (2006.01)
  *E03C 1/10* (2006.01)

(52) U.S. Cl.
  CPC .......... *F16K 27/0209* (2013.01); *F16K 27/12* (2013.01); *F16K 37/0091* (2013.01)

(58) Field of Classification Search
  CPC .......... F16F 1/42; F16K 27/0209; F16K 1/36; F16K 17/30; F16K 27/12; F16K 37/0091; E03F 7/04; Y10T 137/5196; Y10T 137/5153
  USPC .................................................. 137/329.02
  See application file for complete search history.

(56) References Cited

U.S. PATENT DOCUMENTS

| | | | |
|---|---|---|---|
| 953,940 A * | 4/1910 | Beam | F16K 1/42 |
| | | | 251/360 |
| 2,310,586 A | 2/1943 | Lohman | |
| 2,514,374 A | 7/1950 | Cooper | |
| 2,827,921 A | 3/1958 | Sherman et al. | |
| 3,173,439 A | 3/1965 | Griswold et al. | |
| 3,189,037 A | 6/1965 | Modesto | |
| 3,429,291 A | 2/1969 | Hoffman | |
| 3,570,537 A | 3/1971 | Kelly | |
| 3,837,357 A | 9/1974 | Slaughter | |
| 3,837,358 A | 9/1974 | Zieg et al. | |
| 3,859,619 A | 1/1975 | Ishihara et al. | |
| 3,896,850 A | 7/1975 | Waltrip | |
| 3,905,382 A * | 9/1975 | Waterston | E03C 1/108 |
| | | | 137/218 |
| 3,906,987 A | 9/1975 | Rushforth et al. | |
| 3,996,962 A | 12/1976 | Sutherland | |
| 4,014,284 A | 3/1977 | Read | |
| 4,244,392 A | 1/1981 | Griswold | |
| 4,284,097 A | 8/1981 | Becker et al. | |
| 4,416,211 A | 11/1983 | Hoffman | |
| 4,453,561 A | 6/1984 | Sands | |
| 4,489,746 A | 12/1984 | Daghe et al. | |
| 4,523,476 A | 6/1985 | Larner | |
| 4,618,824 A | 10/1986 | Magee et al. | |
| 4,667,697 A | 5/1987 | Crawford | |
| 4,694,859 A | 9/1987 | Smith | |
| 4,776,365 A * | 10/1988 | Bathrick | F16K 1/02 |
| | | | 137/329.02 |
| 4,777,979 A | 10/1988 | Twerdochlib | |
| 4,920,802 A | 5/1990 | McMullin et al. | |
| 4,945,940 A | 8/1990 | Stevens | |
| 5,008,841 A | 4/1991 | McElroy | |
| 5,024,469 A | 6/1991 | Aitken et al. | |
| 5,072,753 A * | 12/1991 | Ackroyd | E03C 1/104 |
| | | | 137/527 |
| 5,125,429 A | 6/1992 | Ackroyd et al. | |
| 5,236,009 A * | 8/1993 | Ackroyd | E03C 1/104 |
| | | | 137/454.2 |
| 5,299,718 A * | 4/1994 | Shwery | B65D 47/248 |
| | | | 137/903 |
| 5,404,905 A | 4/1995 | Lauria | |
| 5,425,393 A | 6/1995 | Everett | |
| 5,520,367 A | 5/1996 | Stowers | |
| 5,551,473 A | 9/1996 | Lin et al. | |
| 5,566,704 A | 10/1996 | Ackroyd et al. | |
| 5,584,315 A | 12/1996 | Powell | |
| 5,586,571 A | 12/1996 | Guillermo | |
| 5,669,405 A | 9/1997 | Engelmann | |
| 5,711,341 A | 1/1998 | Funderburk et al. | |
| 5,713,240 A | 2/1998 | Engelmann | |
| 5,901,735 A | 5/1999 | Breda | |
| 5,918,623 A * | 7/1999 | Hidessen | F16K 31/363 |
| | | | 137/538 |
| 5,992,441 A * | 11/1999 | Enge | B60K 15/03519 |
| | | | 137/68.16 |
| 6,123,095 A | 9/2000 | Kersten et al. | |
| 6,155,291 A | 12/2000 | Powell | |
| 6,170,510 B1 | 1/2001 | King et al. | |
| 6,343,618 B1 * | 2/2002 | Britt | F16K 15/035 |
| | | | 137/527 |
| 6,349,736 B1 | 2/2002 | Dunmire | |
| 6,374,849 B1 | 4/2002 | Howell | |
| 6,378,550 B1 | 4/2002 | Herndon et al. | |
| 6,443,184 B1 | 9/2002 | Funderburk | |
| 6,471,249 B1 | 10/2002 | Lewis | |
| 6,513,543 B1 | 2/2003 | Noll et al. | |
| 6,546,946 B2 | 4/2003 | Dunmire | |
| 6,581,626 B2 | 6/2003 | Noll et al. | |
| 6,659,126 B2 | 12/2003 | Dunmire et al. | |
| 6,675,110 B2 | 1/2004 | Engelmann | |
| 7,114,418 B1 | 10/2006 | Allen | |
| 7,434,593 B2 * | 10/2008 | Noll | F16K 15/063 |
| | | | 137/454.2 |
| 7,506,395 B2 | 3/2009 | Eldridge | |
| 7,934,515 B1 | 5/2011 | Towsley et al. | |
| 8,220,839 B2 | 7/2012 | Hall | |
| 8,997,772 B2 | 4/2015 | Noll et al. | |
| 9,091,360 B2 | 7/2015 | Frahm | |
| 9,546,475 B2 | 1/2017 | Lu | |
| 9,995,605 B2 | 6/2018 | Konno et al. | |
| 10,132,425 B2 | 11/2018 | Di Monte | |
| 10,561,874 B2 | 2/2020 | Williams et al. | |
| 10,719,904 B2 | 7/2020 | Yasumuro et al. | |
| 10,883,893 B2 | 1/2021 | Shaw et al. | |
| 10,914,412 B2 | 2/2021 | Doughty et al. | |
| 10,962,143 B2 | 3/2021 | Cis et al. | |
| 2002/0043282 A1 | 4/2002 | Horne et al. | |
| 2002/0078801 A1 | 6/2002 | Persechino | |
| 2003/0000577 A1 | 1/2003 | Noll et al. | |
| 2003/0168105 A1 | 9/2003 | Funderburk | |
| 2004/0045604 A1 | 3/2004 | Dunmire et al. | |
| 2004/0107993 A1 | 6/2004 | Stephens | |
| 2005/0092364 A1 | 5/2005 | Furuya et al. | |
| 2005/0199291 A1 | 9/2005 | Price et al. | |
| 2006/0076062 A1 | 4/2006 | Andersson | |
| 2006/0196542 A1 | 9/2006 | Yen | |
| 2007/0181191 A1 | 8/2007 | Wittig et al. | |
| 2007/0193633 A1 | 8/2007 | Howell et al. | |
| 2007/0204916 A1 | 9/2007 | Clayton et al. | |
| 2007/0204917 A1 | 9/2007 | Clayton et al. | |
| 2007/0240765 A1 | 10/2007 | Katzman et al. | |
| 2008/0145739 A1 | 6/2008 | Adams et al. | |
| 2008/0289567 A1 | 11/2008 | Gordon | |
| 2009/0136935 A1 | 5/2009 | Petersen | |
| 2009/0194719 A1 | 8/2009 | Mulligan | |
| 2011/0067225 A1 | 3/2011 | Bassaco | |
| 2011/0309076 A1 | 12/2011 | Liebenberg et al. | |
| 2012/0248759 A1 | 10/2012 | Feith | |
| 2013/0026743 A1 | 1/2013 | Baca | |
| 2013/0255452 A1 | 10/2013 | Kovach | |
| 2014/0109986 A1 | 4/2014 | Cordes | |
| 2017/0023141 A1 * | 1/2017 | Andersson | F16K 15/033 |
| 2018/0156488 A1 | 6/2018 | Stanley et al. | |
| 2019/0043157 A1 | 2/2019 | Yasumuro et al. | |
| 2019/0136935 A1 * | 5/2019 | Hulstein | F16F 9/446 |
| 2019/0162341 A1 | 5/2019 | Chiproot | |
| 2019/0271428 A1 | 9/2019 | O'Connor et al. | |
| 2019/0323618 A1 | 10/2019 | Fletcher et al. | |
| 2020/0141612 A1 | 5/2020 | Thibodeaux | |
| 2021/0172157 A1 | 6/2021 | Burke et al. | |
| 2021/0230850 A1 | 7/2021 | Bouchard et al. | |

FOREIGN PATENT DOCUMENTS

| | | |
|---|---|---|
| DE | 8525261 U1 | 11/1985 |
| DE | 202014102566 U1 | 8/2014 |
| DE | 202014102568 U1 | 9/2015 |
| EP | 1521004 A1 | 4/2005 |
| EP | 3832183 A1 | 6/2021 |
| FR | 2928750 A1 | 9/2009 |
| GB | 1231579 A | 11/1967 |

(56) References Cited

FOREIGN PATENT DOCUMENTS

| JP | 2002213629 A | 7/2002 |
|----|--------------|--------|
| WO | 2003060459 A1 | 7/2003 |
| WO | 2020023584 A1 | 1/2020 |

OTHER PUBLICATIONS

Watt TK-99E Backflow Preventer Test Kit Product Specifications and Test Information, IS-TK99E 0829, 2009, 4 pages.
Watts Water Technologies Company, Installation, Maintenance & Repair Series 909, LF909, 909RPDA, LF909RPDA, 2016, 8 pages.
Watts Water Company, Series 909RPDA for Health Hazard Applications, 2016, 4 pages.
Watts Regulator Co., Watts ACV 113-6RFP Flood Protection Shutdown Valve for Health Hazard Applications, 2020, 4 pages.
European Search Report for European Patent Application No. 20192133.5 dated Feb. 1, 2021, 9 pages.
Ames Fire & Waterworks, division of Watts Industries, F-A-Spools/Flanges, 2001, 4 pages.
Watts, S-RetroFit-Simple, 2017, 2 pages.
*Zurn Industries, LLC* vs. *Conbraco Industries, Inc.*, Complaint for patent infringement, United States District Court for the Center District of California Western Division, Case No. 2.16-CV-5656, Jul. 29, 2016; 5 pages.
Wilkins Company, Model 375/475MS Series, Installation, Maintenance and Instruction Sheet, 2006, 1 page.
Apollo Valves PVB4A Series Installation, Operation and Maintenance Manual for Model PVB4A 1/2"-2" Pressure Vacuum Breaker Backflow Preventer, dated Jan. 11, 2012, 12 pages.
Apollo Valves PVB4A Series Installation, Operation, and Maintenance Manual, copyright May 2009, 9 pages.
Watts Water Technologies Company Brochure ES LF800M4QT for Health Hazard Applications Lead Free Series LF8 M4QT Anti-Siphon Vacuum Breakers Sizes 1/2"-2", copyright 2013, 4 pages.
Watts, "Double Check Valve Assembly Backflow Preventers, Bronze," Article 1, 2021, 6 pages.
Watts, "Reduced Pressure Zone Assembly Backflow Preventers, Bronze Body, Sizes 1/4-2 IN," Article 1, 2021, 16 pages.
Miscellaneous Communication issued in European patent application No. 20211811.3, dated Apr. 5, 2021, 8 pages.
Office Action issued in corresponding Chinese patent application No. 20201920527.3, dated Mar. 10, 2021, 1 page (translation unavailable).
International Search Report and Written Opinion issued in corresponding international patent application No. PCT/US2021/046208, dated Dec. 1, 2021, 8 pages.
International Search Report and Written Opinion issued in corresponding International Patent Application No. PCT/US2021/062395, dated Feb. 23, 2022, 14 pages.
International Search Report and Written Opinion issued in corresponding International Patent Application No. PCT/US2021/046101, dated Nov. 22, 2021, 8 pages.
Extended European Search Report received for European Patent Application No. 20211811.3, dated May 4, 2021, 2 pages.

\* cited by examiner

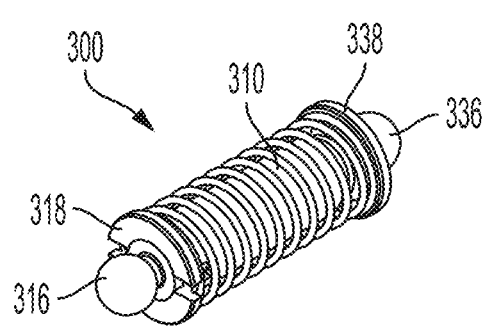
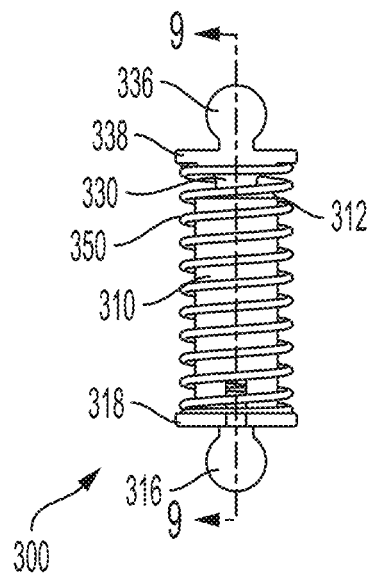
FIG. 7
FIG. 8
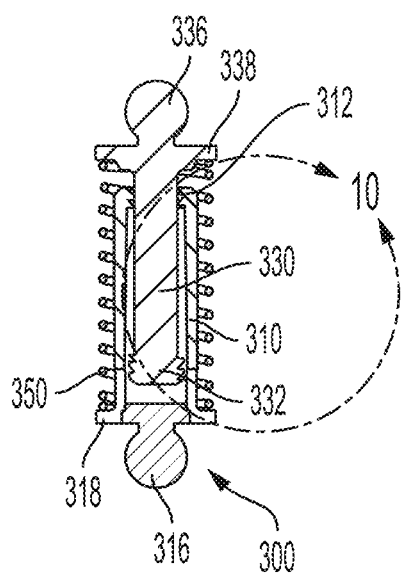
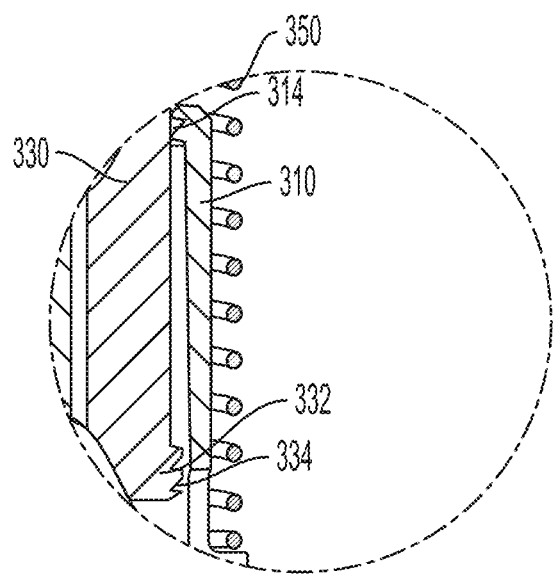
FIG. 9
FIG. 10

BACKFLOW PREVENTION ASSEMBLY WITH TELESCOPING BIAS ASSEMBLY AND REVERSIBLE VALVE MEMBER

CROSS-REFERENCE

This application claims priority to U.S. Provisional Patent Application No. 63/066,411, filed Aug. 17, 2020, which is incorporated herein by reference.

FIELD OF THE DISCLOSURE

The subject disclosure relates to backflow prevention valves and assemblies, and more particularly to backflow prevention valves and assemblies having a reversible telescoping bias spring retention assembly coupled to a reversible valve member.

BACKGROUND

In many water systems, backflow prevention (BFP) assemblies allow fluid and even solids to flow only in a desired, i.e., a forward, direction. As backsiphonage or backflow can present contamination and health problems, the backflow prevention valves and assemblies prevent flow in an undesired direction, i.e., a backward or reverse direction. BFP assemblies are installed in buildings, such as residential homes, and commercial buildings and factories, to protect public water supplies by preventing the reverse flow of water from the buildings back into the public water supply.

A typical BFP assembly includes an inlet shutoff valve and an outlet shutoff valve with a backflow prevention valve assembly extending between the inlet and outlet shutoff valves. Many different configurations of BFP assemblies are commercially available, each being differently configured.

Owing to the fact that BFP assemblies are important for water safety, BFP units are tested annually, often per government regulations, to assure proper operating condition. Specifically, fluid pressure measurements are taken at specified locations in the BFP unit. If it is determined that a check valve needs to be repaired or replaced, the inlet and outlet shutoff valves have to be closed, the check valve fixed and tested, the shutoff valves opened and the apparatus confirmed to be operating per any required ordinances and/or standards. The process is time-consuming and the steps have to be performed in the correct sequence and manner in order to not contaminate the public water supply, inadvertently flood an area, and return the BFP assembly to working order.

SUMMARY

From time to time, various components of a BFP assembly may need replacement, which is not only difficult and time consuming but results in downtime for the fluid network. Components for the BFP assembly that are easier to manufacture, assemble and install as well as more robust would reduce: the difficulty of fabrication and repair; repair time; assembly error from improper fabrication or otherwise; and the difficulty of installation. Preferably, a telescoping spring retainer assembly provides some or all of these benefits along with reducing the required components. When the telescoping spring retainer assembly is coupled to a reversible valve member, these benefits are further enhanced.

The subject technology is directed to a valve assembly including a spring retention assembly coupled to a valve member. The spring retention assembly has an elongated cylinder portion having an open threaded end and a closed end. An elongated piston portion has a free end and a threaded tab end configured to thread through the open threaded end and, thereby, be slideably captured in the cylinder portion. A spring couples to the body portion and the piston portion to provide a force to urge the body portion and the piston away from one another, wherein the closed end and the free end are similarly shaped so that the spring retention assembly can be reversibly mounted. A valve member includes a central disc having a first side and a second side, each side forming a sealing region and having a retention cup, wherein both retention cups can capture the closed end or the free end so that the valve member is reversible. A hinge portion extends radially from the central disc.

In one embodiment, the subject disclosure is directed to a spring retention assembly for a valve assembly, comprising an elongated cylinder portion having an open threaded end and a closed end. An elongated piston portion has a free end and a threaded tab end configured to thread through the open threaded end and, thereby, be slideably captured in the cylinder portion. A helical spring couples to the body portion and the piston portion to provide a force to urge the body portion and the piston away from one another, wherein the closed end and the free end are similarly shaped so that the spring retention assembly can be reversibly mounted.

In another embodiment, the subject disclosure is directed to a spring retention assembly for a valve assembly having a cylinder portion with an open threaded end. A piston portion has a threaded tab end configured to thread through the open threaded end and, thereby, be captured in the cylinder portion for sliding motion. A spring couples to the body portion and the piston portion to provide a force to urge the body portion and the piston away from one another. Preferably, the cylinder portion has a closed end with a retention collar, the piston portion has a retention collar, and the spring extends between the retention collars. The spring may be under a predetermined amount of compression less than an amount of force of a normal forward flow of fluid in the backflow prevention system. The inner diameter of the cylinder portion and an outer diameter of the threaded tab end can be approximately equal so that lateral movement of the piston portion is reduced.

In still another embodiment, the subject disclosure is directed to a spring retention assembly for a valve assembly that includes a telescoping central portion with a first free end and a second free end, wherein the ends are similarly shaped so that the spring retention assembly can be reversibly mounted. Preferably, the ends are bulbous to fit in a hollow formed in the housing of the valve assembly or a retention cup of the valve element. Another embodiment includes a first retention collar on the first free end, a second retention collar on the second free end, and a spring extending between the retention collars so that the ends are configured to mount to either retention collar for simplification of the parts required.

The subject technology is also directed to a valve member for a valve assembly including a central disc having a first side and a second side, each side forming a sealing region and having a retention cup, wherein the sealing regions and the retention cups are similarly shaped so that the valve member is reversible. A hinge portion extends radially from the central disc. The sealing regions may be ring-shaped elastomeric inserts. Preferably, the retention cups are centrally located on the respective side with a plurality of deflectable fingers for receiving a spherical end of a spring retention assembly. By being the same shape and size, the deflectable fingers facilitate either side interacting with the spring retention assembly. By the first and second sides being symmetrical about an axis, reversibility of the valve member is also facilitated. In one embodiment, the hinge portion includes a pair of opposing arms extending radially from the central disc and having distal protruding tabs.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

FIG. 7 is a perspective view of the telescoping spring retainer assembly of FIG. 3 in a compressed position.

FIG. 8 is a plan view of the telescoping spring retainer assembly of FIG. 7.

FIG. 9 is a cross-sectional view of the telescoping spring retainer assembly taken along line 9-9 of FIG. 8.

FIG. 10 is a partial detailed cross-section view of the telescoping spring retainer assembly shown in circle 10 of FIG. 9.

DETAILED DESCRIPTION

Figure 1:
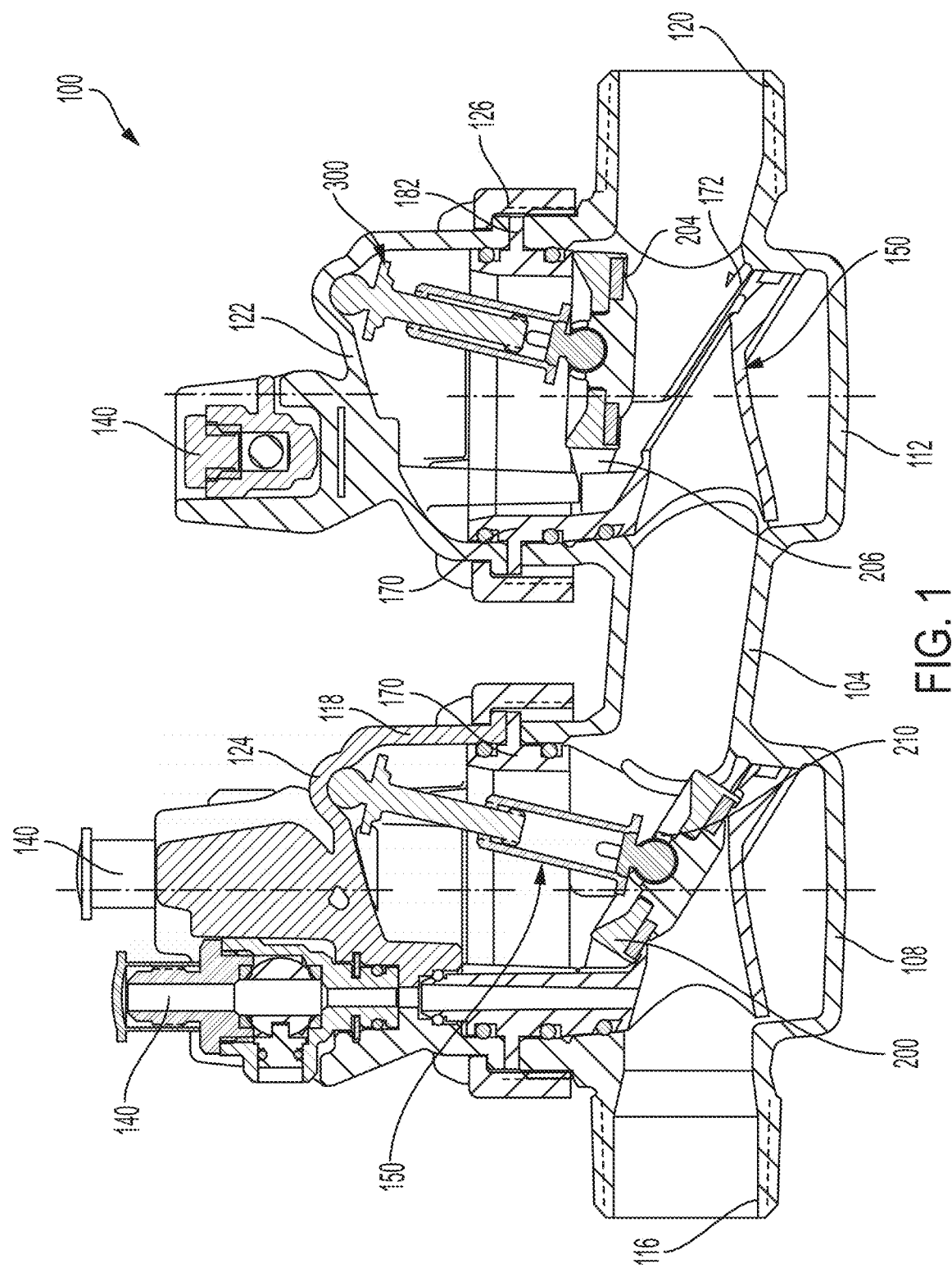
FIG. 1 is a cross-sectional view of a backflow prevention BFP assembly with only the second check valve assembly open in accordance with the present disclosure.

The subject technology overcomes many of the prior art problems associated with backflow prevention assemblies. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 2:
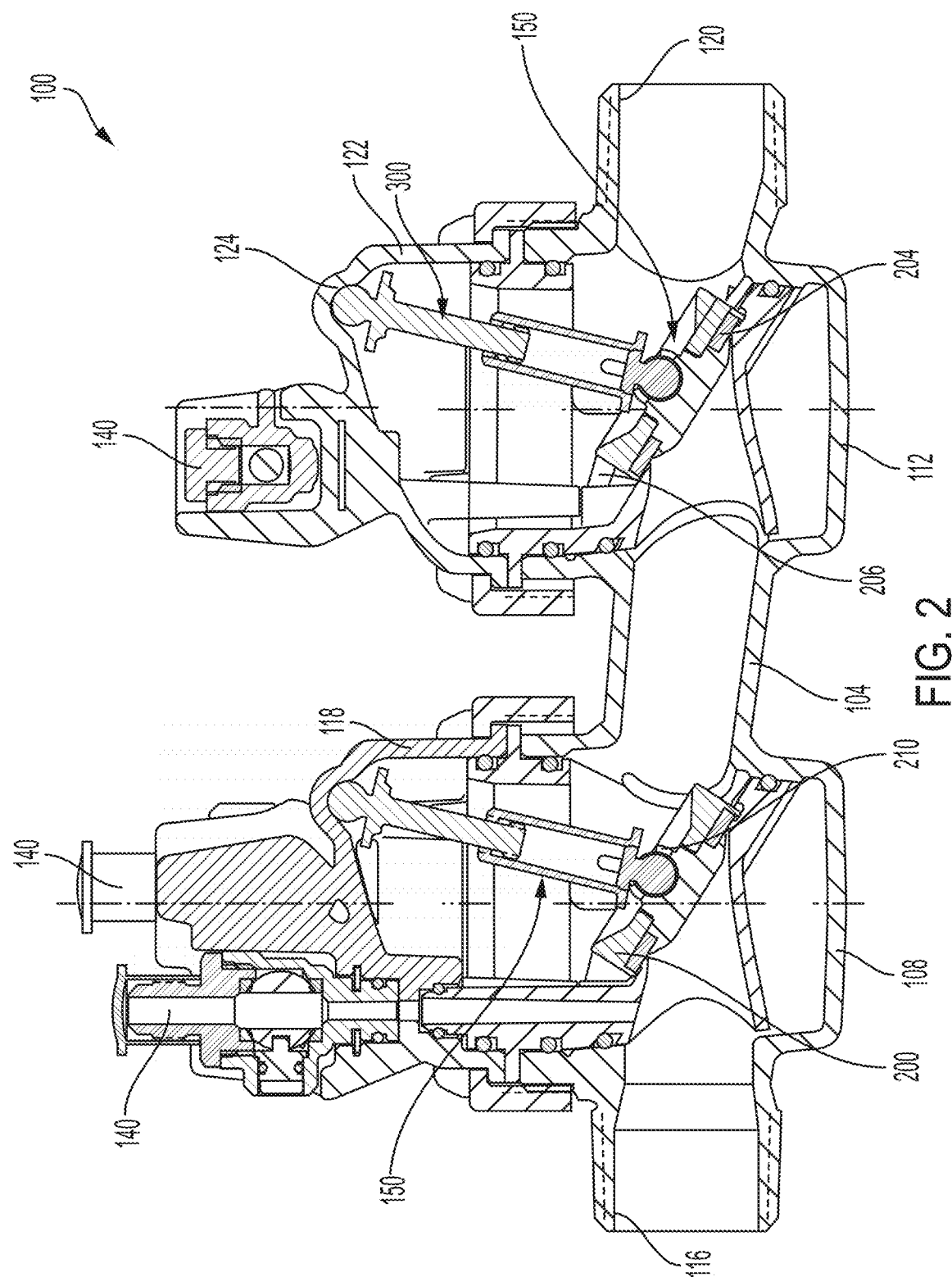
FIG. 2 is a cross-sectional view of the BFP assembly of FIG. 1 with both check valve assemblies closed in accordance with the present disclosure.

Referring now to FIGS. 1 and 2, there is shown a backflow prevention (BFP) assembly 100 in accordance with an aspect of the present disclosure. The BFP assembly 100 may be installed in a fluid system, e.g., a water supply for a building. In normal operation, the backflow prevention assembly 100 operates to carry fluid in only a forward direction, e.g., left to right in FIGS. 1 and 2, from an inlet 116 to an outlet 120. The BFP assembly 100 operates to prevent flow in a backward direction, i.e., a direction from right to left in FIGS. 1 and 2.

The BFP assembly 100 includes a body 104 forming an upstream bucket 108 and a downstream bucket 112. Each bucket 108, 112 is enclosed by a test cover 118, 122. The test covers 118, 122 may include one or more test cocks 140 for sensing pressure at various locations within the BFP assembly 100. The downstream test cover 118 includes two test cocks 140 and the upstream test cover 122 includes a single test cock 140 but the test covers 118, 122 are otherwise very similar.

Each bucket 108, 112 includes a check valve assembly 150 for selectively opening and closing flow through the respective bucket 108, 112. Preferably, the check valve assemblies 150 are interchangeable although as shown, the check valve assemblies 150 are different. Each check valve assembly 150 has frame 170 fit into the respective bucket 108, 112. The frame 170 retains a valve member 200, which selectively closes against a circular valve seat 172 of the frame 170. The valve members 200 are generally disc-shaped with an annular sealing region 204 that seals against the valve seat 170. The valve member 200 is connected to the frame 170 by a hinge portion 206 that allows rotation of the valve member 200 away from the valve seat 172 to open flow.

In each check valve assembly 150, a spring retainer assembly 300 provides a biasing force to urge the valve member 200 against the valve seat 172. If the pressure downstream of the valve member 200 exceeds the force of the spring retainer assembly 300, the check valve assembly 150 will open to allow forward flow. If not, the spring retainer assembly 300 will keep the check valve assembly 150 closed. The spring retainer assembly 300 extends between the respective test cover 118, 122 and the valve member 200. The test covers 118, 122 form hollows 124 for coupling to the spring retainer assembly 300 whereas the valve member 200 has a retention cup 210 for coupling to the spring retainer assembly 300.

Referring now to FIGS. 3-10, various views of the spring retainer assembly 300 are shown. The spring retainer assembly 300 includes a telescoping central portion 302. The telescoping central portion 302 includes a somewhat tubular cylinder portion 310 with an open lip end 312. The open lip end 312 has internal threads 314 best seen in FIGS. 6 and 10. A closed free end 316 opposes the open lip end 312 and has a spherical or bulbous shape for coupling to the retention cup 210 of the valve member 200 or in the hollow 124 of the test cover 118, 122, as the case may be. Adjacent the bulbous closed free end 316, a retention collar 318 is formed.

The spring retainer assembly 300 also includes a piston portion 330 that partially slides within the cylinder portion 310. The piston portion 330 has a tab end 332 that is captured within the cylinder portion 310. The tab end 332 has outer threads 334. To couple the cylinder portion 310 and the piston portion 330 together, the tab end 332 is threaded through the open lip end 312 of the cylinder portion 310. Once coupled, the tab end 332 can slide within the cylinder portion 310 but is retained by the lip end 312 until unscrewed.

Figure 3:
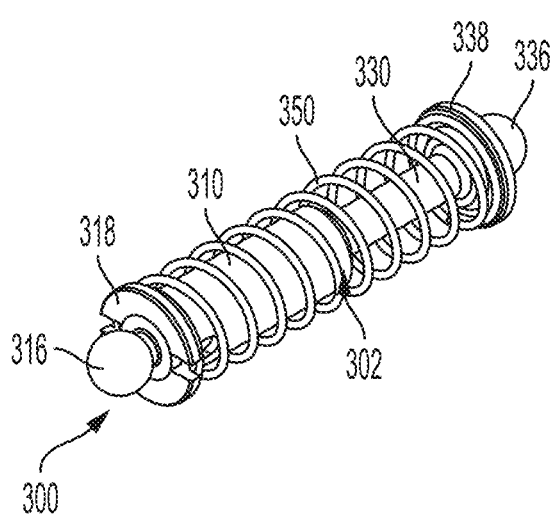
FIG. 3 is perspective view of a telescoping spring retainer assembly in an extended position for a check valve assembly for a BFP assembly in accordance with the present disclosure.
Figure 4:
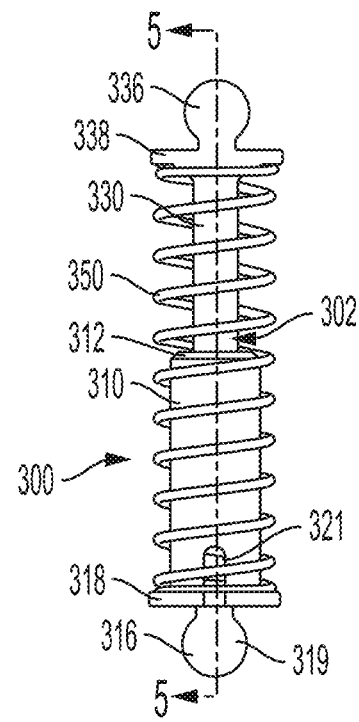
FIG. 4 is a plan view of the telescoping spring retainer assembly of FIG. 3.
Figure 5:
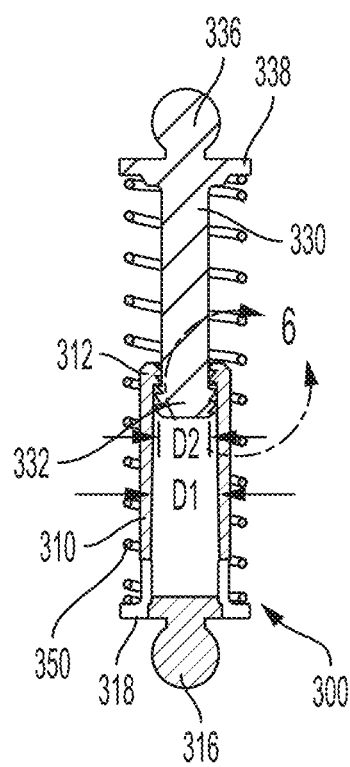
FIG. 5 is a cross-sectional view of the telescoping spring retainer assembly taken along line 5-5 of FIG. 4.

The piston portion 330 has a free end 336 with a retention collar 338. A spring 350 is captured and compressed between the retention collars 318, 338 to urge the cylinder portion 310 and piston portion 330 apart as best seen in FIGS. 3-5. Thus, when in the spring retainer assembly 300 is in place between the fixed rigid hollow 124 of a test cover 118, 122 and retention cup 210 of the valve element 200, the spring 350 provides the biasing force to urge the valve element 200 closed (see FIGS. 1 and 2).

As illustrated in FIGS. 7-10 and shown in the downstream check valve assembly 150 of FIG. 2, the spring retainer assembly 300 is compressed by opening of the check valve assembly 150 when the upstream pressure on the valve member 200 exceeds the force provided by the spring 350. In other words, the force of the spring 350 is predetermined to allow the valve element 200 to permit the normal flow of fluid in the forward direction.

Figure 6:
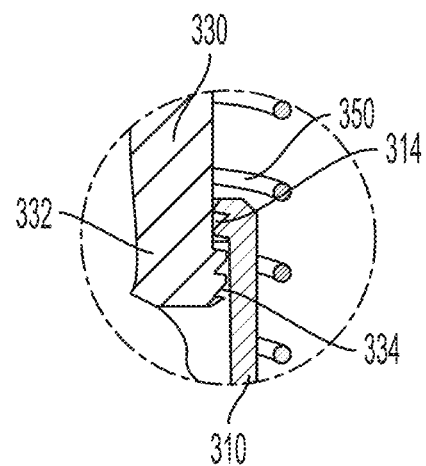
FIG. 6 is a partial detailed cross-section view of the telescoping spring retainer assembly shown in circle 6 of FIG. 5.

In order to minimize wobbling or lateral motion of the piston portion 330 during sliding, an inner diameter D1 of the cylinder portion 310 is approximately the same as the outer diameter D2 of the threaded tab end 332 (see FIG. 6). The threaded tab end 332 also has sufficient length along the axis of movement to be stable inside the cylinder portion 310. In this way, the piston portion 330 moves linearly and is prevented from wobbling. The length of the threaded tab end 332 and cylinder portion 310 are selected to minimize wobbling while still allowing sufficient travel for a fully open and closed check valve 150.

In normal operation, the force exerted by the respective spring retainer assembly 300 on the valve elements 200 is overcome by the pressure exerted by the fluid normally flowing from the inlet 116 to the outlet 120 so that both check valves 150 are open. If, for example, there is a drop in pressure from the supply source, the upstream valve element 200 and the downstream valve 200 will close to prevent backflow as shown in FIG. 2. Similarly, if the normal forward flow is interrupted, one or both of the valve elements 200 is urged in position to cover the valve seat 172 (e.g., FIGS. 1 and 2, respectively) to close the check valve 150 and prevent backflow.

To assemble a check valve 150, the threaded tab end 332 of the piston portion 330 is screwed through the threaded lip end 312 of the cylinder portion 310 to couple the piston portion 330 to the cylinder portion 310. Either end 316, 336 may be coupled to the retention cup 210 of the valve element 200 because each end 316, 336 is similarly shaped. Preferably, the retention cup 210 is flexible and deforms slightly to receive the spherical end 316, 336 without requiring any tools. Once popped in, the bulbous end 316, 336 easily rotates within the retention cup 210. As the test cover 118 is mounted is mounted on the check valve 150, the other end 316, 336 of the spring retention assembly 300 is aligned to the hollow 124, which captures the end 316, 336 while also allowing for easy rotation of the end 316, 336 therein. Thus, the spring retention assembly 300 can be arranged in a reverse arrangement to that which is shown and assembly is simplified.

Repair of the spring retention assembly 300 is also simplified. For example, if the piston portion 330 is broken, the threaded tab end 332 is unthreaded from the cylinder portion 310. To replace the broken piston portion 330, a new piston portion 330 can be threaded into the previously used cylinder portion 310. Similarly, without tools, the portions 310, 330 can be separated to replace the helical spring 350.

In one embodiment, the ends 316, 318 include a spherical portion 319 having a threaded post 321 that screws into or otherwise mounts to the retention collar 318, 338. Hence, the threaded posts 312 are the same so that fewer parts are required and manufacturing and repair is simplified. Further, as tools are not required, assembly is simplified. In another embodiment, the ends 316, 318 are different sizes to preclude reversibility. For example, only one end 316, 318 may be small enough to fit into the retention cup 210 so that there is only one orientation that couples the spring retention assembly 300 to the valve element 200.

In another embodiment, the spring retention assembly does not include a helical spring around the outside. Instead, the helical spring or even a compressible insert is provided with the cylinder portion to generate the proper bias.

Figure 11A:
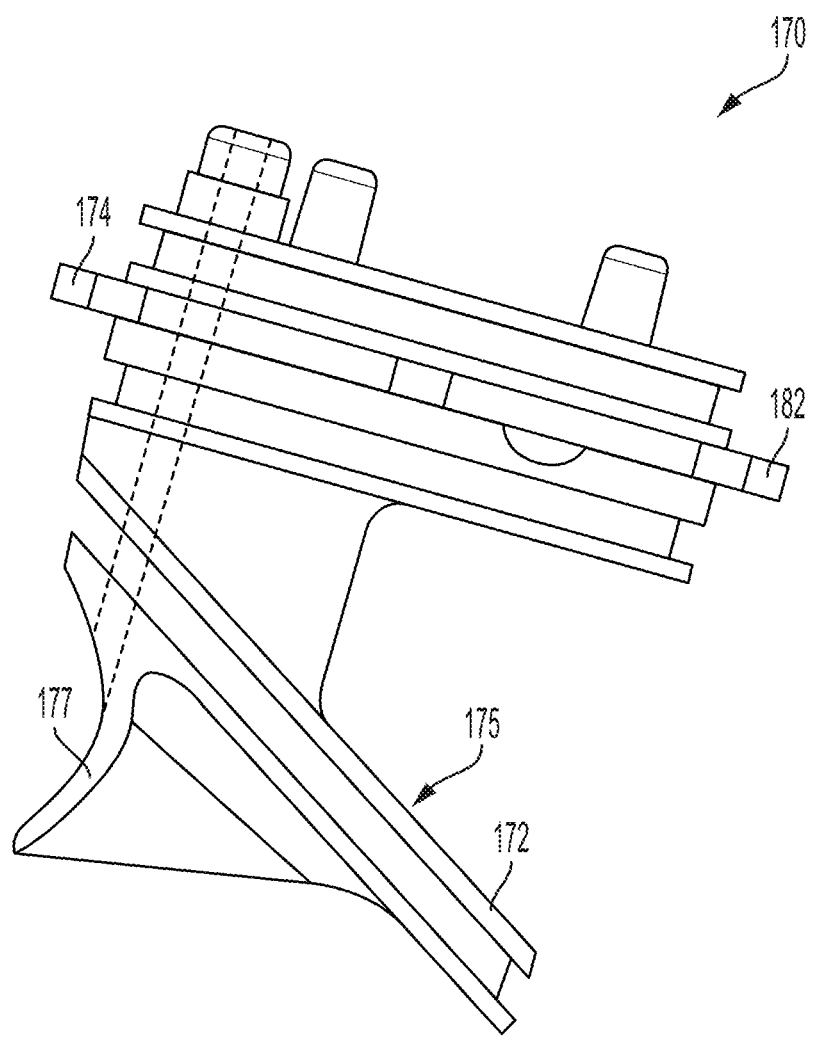
FIG. 11A is an isolated side view of a frame for use in a check valve assembly in accordance with the subject disclosure.
Figure 11B:
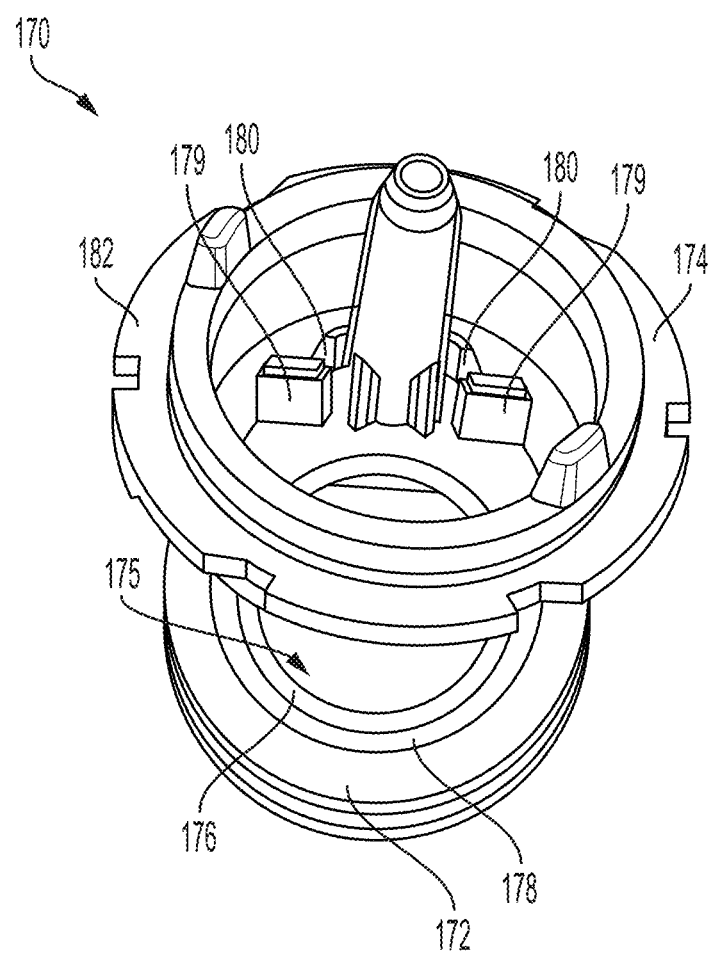
FIG. 11B is an isolated perspective view of a frame for use in a check valve assembly in accordance with the subject disclosure.

Referring now to FIGS. 11A and 11B, isolated side and perspective views of a frame 170 for use in a check valve assembly in accordance with the subject disclosure are shown. The frame 170 snugly fits into the respective bucket. A top portion 174 seals against the BFP assembly body and a lower portion 177 narrows the fluid path through the BFP assembly to an opening 175 of the valve seat 172. The top portion 174 includes a circular ledge 182 that acts as an insertion hardstop. A retaining nut 126 (see FIG. 1) threads onto the body 104 to secure the frame 170 thereto. The valve seat 172 also includes an annular raised rim 176 as a sealing surface with a recess 178 surrounding the rim 176.

The frame 170 includes standoffs 179 adjacent the opening 175 and forming a pair of opposing notches 180. The notches 180 may be U-shaped to receive a valve member such that the valve member is hinged to the frame 170 for selective opening and closing of the opening 175. The notches 180 may also simply be holes or similar shape to receive a protruding tab to create a hinge arrangement.

Figure 12:
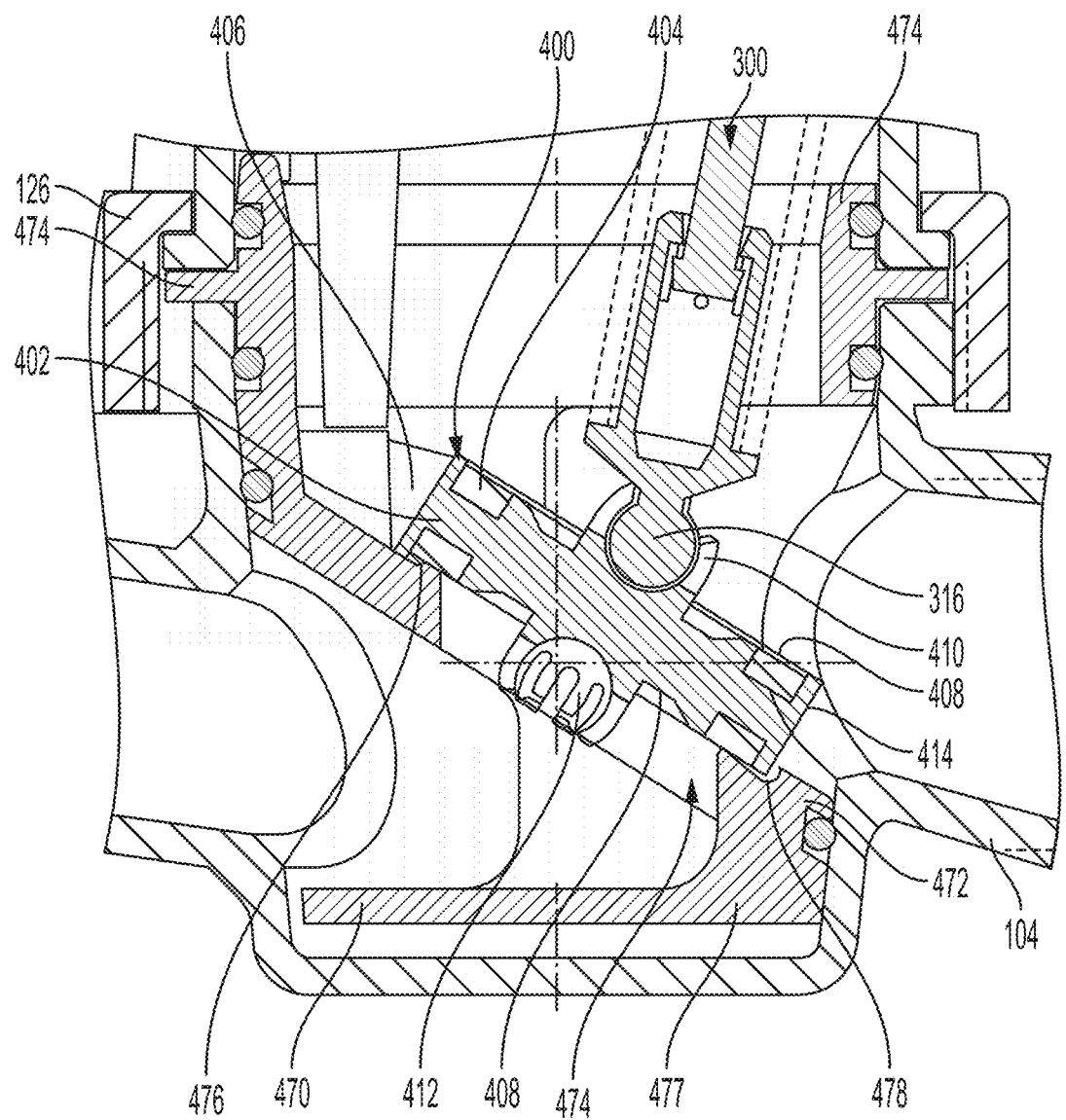
FIG. 12 is a partial cross-sectional view of a reversible valve member coupled to a frame in a check valve assembly in accordance with the subject disclosure.

Referring now to FIG. 12, a partial cross-sectional view of a reversible valve member 400 coupled to a frame 450 in a check valve assembly of a BFP assembly in accordance with the subject disclosure is shown. Like reference numerals in the "400" series are used to refer to similar elements between the frame 170 and the frame 470. Similarly "400"

series numbers are also used to describe like elements between the valve members 200, 400 so that the following description can be directed to the differences.

The valve member 400 is reversible by being symmetrical. The valve member 400 has a central disc 402. Each side of the central disc 402 has a central retention cup 410. The cups 410 have a plurality of fingers 412 that deflect to allow manual insertion of the end 316 of the spring retention assembly 300 to capture the end 316 therein. Once captured, the end 316 can smoothly rotate within the cup 410 like a ball-and-socket joint. Similar connections like a condyloid joint, saddle joint, hinge joint, pivot joint and the like may be used. The valve member 400 also has a radially outward ring-shaped sealing region 404 on each side 408. An outer edge 414 of the central disc 402 may be relatively thicker than the sealing region 404. The hinge portion 406 extends from the outer edge 414 of the central disc 402. In one embodiment, the sealing surface 476 is a ring-shaped elastomeric insert on each side 408.

Once assembled, as shown in the closed position in FIG. 12, the spring retention assembly 300 urges the valve member 400 against the valve seat 472. The sealing region 404 of the valve member 400 and the sealing surface 476 of the frame seat 172 are sealingly engaged to close the opening 475. When the upstream fluid pressure exceeds the urging force of the spring retention assembly 300, the valve member 400 rotates to open the opening 475 and, in turn, the end 316 rotates within the deflectable fingers 412 of the retention cup 410.

By being symmetrical, the valve member 400 can be arranged in a reverse arrangement and work in the same manner. Thus, assembly is simplified. Further, repair of the valve member 400 is also simplified. For example, if the valve member 400 is broken on one side in the field, rather than locate a replacement part, the valve member 400 can be unhinged, flipped and rehinged. As a result, the required number of parts is reduced with assembly and repair simplified. Preferably, tools are also not required.

Figure 13A:
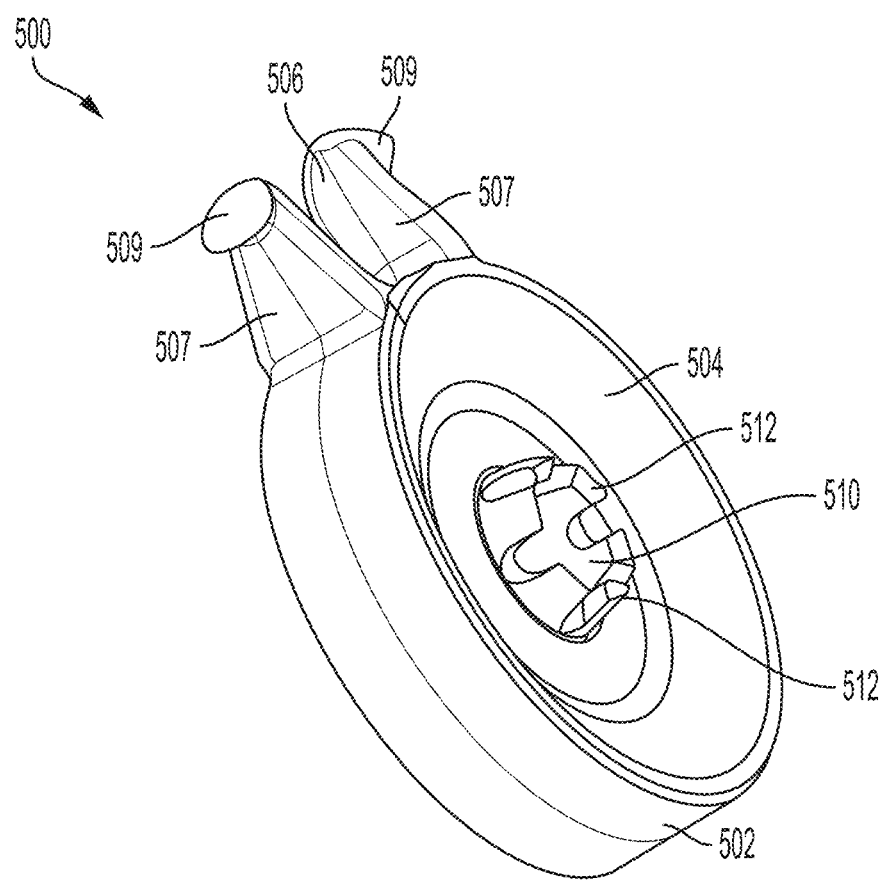
FIG. 13A is an isolated perspective view of another reversible valve element for use in a check valve assembly in accordance with the subject disclosure.
Figure 13B:
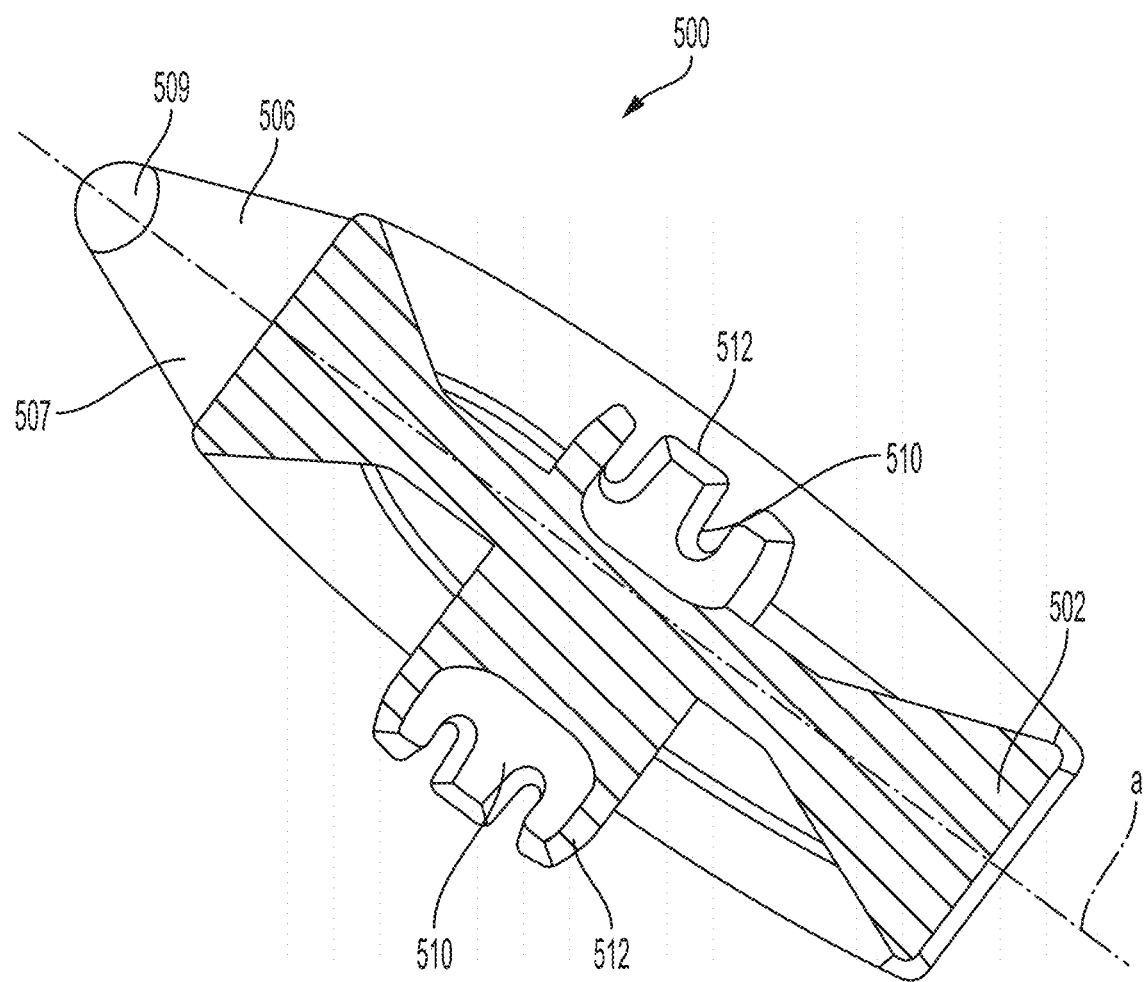
FIG. 13B is a cross-sectional view of the reversible valve member of FIG. 13A.

Referring now to FIGS. 13A and 13B, isolated views of another reversible valve member 500 for use in a check valve assembly in accordance with the subject disclosure are shown. As will be appreciated by those of ordinary skill in the pertinent art, the valve member 500 utilizes similar principles to the valve members 200, 400 described above. Accordingly, like reference numerals in the "500" series are used to indicate like elements.

The primary difference of the valve member 500 is the sloped sealing region 504 as best seen in FIG. 13B. The sloped sealing region 504 may be formed by partially fully coating the central disc 502. Alternatively, the entire central disc 502 may be formed from an elastomeric or other material with the desired sealing properties. The valve member 500 is still symmetrical about an axis of symmetry "a" for reversibility.

The hinge portion 506 includes a pair of opposing radially extending flexible arms 507. The arms 507 have distal tabs 509 protruding outward to engage the frame. By manually deflecting the arms 507 inward (e.g, closer together), the tabs 509 can be snap-fit into the notches of the frame. In another embodiment, the hinge portion and the standoff of the frame have transverse passages for receiving a hinge pin to create the hinge. It is envisioned that the tabs 509 may simply rest in the notches with the force of the spring assembly being sufficient so that the tabs 509 float in place to allow easy freedom of movement.

Figure 14:
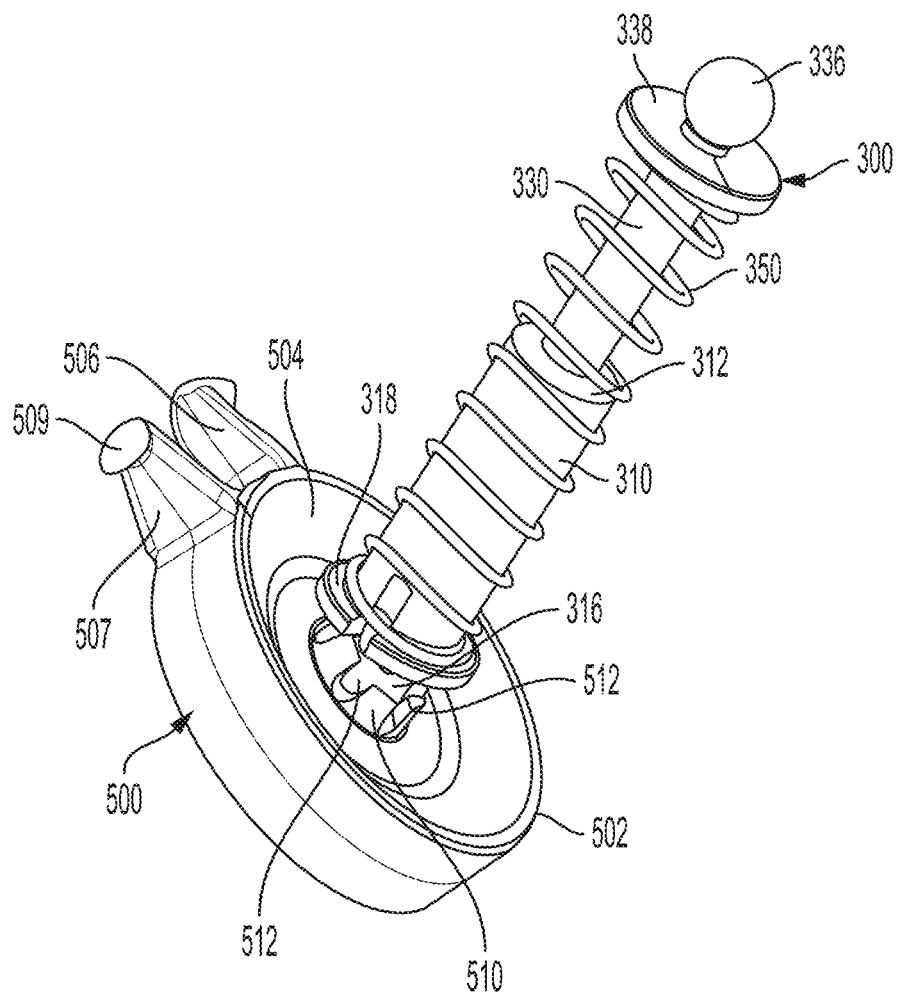
FIG. 14 is an isolated perspective view of a telescoping spring retention assembly coupled to a reversible valve member for use in a check valve assembly in accordance with the subject disclosure.
Figure 15:
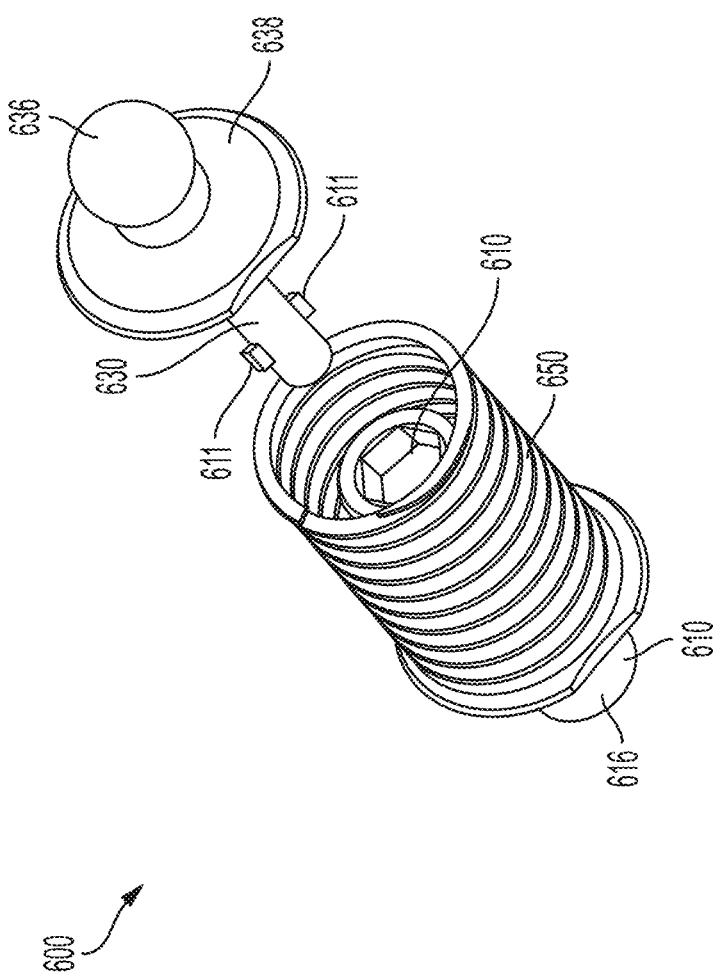
FIG. 15 is perspective exploded view of another telescoping spring retainer assembly for a check valve assembly for a BFP assembly in accordance with the present disclosure.

Referring now to FIG. 14, an isolated perspective view of the telescoping spring retention assembly 300 coupled to the reversible valve member 500 in accordance with the subject disclosure is shown. Again, if the valve member 500 becomes damaged in the field (e.g., one of the cups 512 become broken), the valve member 500 can simply be flipped and reinstalled without tools in the check valve assembly. Similarly, the orientation of the valve member 500 and spring retention assembly during initial assembly is not important, which makes assembly easier.

Referring now to FIGS. 15-18, various views of another spring retainer assembly 600 are shown. Similar elements to those described in connection with above-described embodiments are indicated with the like reference numbers in the "600" series. Many elements are essentially the same as those of the foregoing embodiments and, thus, are not further described herein. Thus, the following description relates to the differences of the spring retainer assembly 600.

Figure 17:
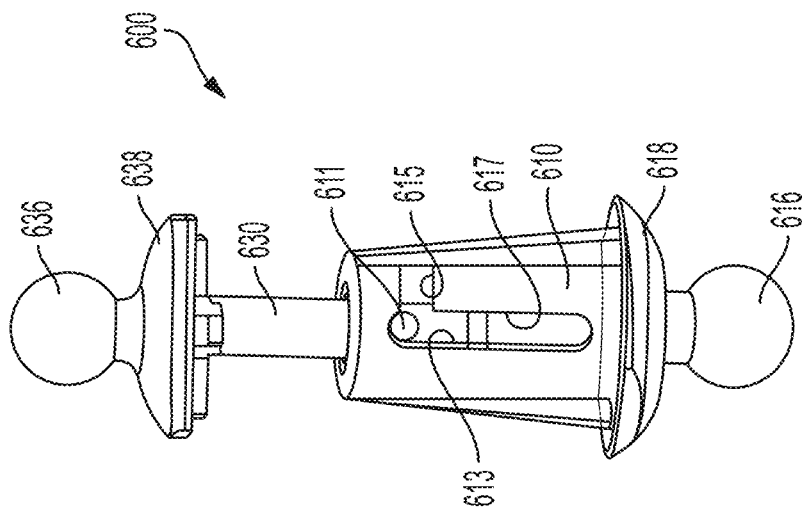
FIG. 17 is another side view of the telescoping spring retainer assembly of FIG. 15.

The spring retainer assembly 600 has a piston portion 630 with opposing buttons 611 near the end 632 for coupling to the cylinder portion 610. The cylinder portion 610 forms opposing two-part slots 613 that capture the buttons 611 to guide the telescoping motion. Each two-part slot 613 has a cross-wise portion 615 and an axial portion 617. During normal operation, the buttons 611 are captured in the axial portion 617 of the two-part slots 613 to guide linear motion and prevent the spring retainer assembly 600 from coming apart if the test cover is opened or removed. As shown in FIG. 17, the spring retainer assembly 600 is fully extended.

Figure 16:
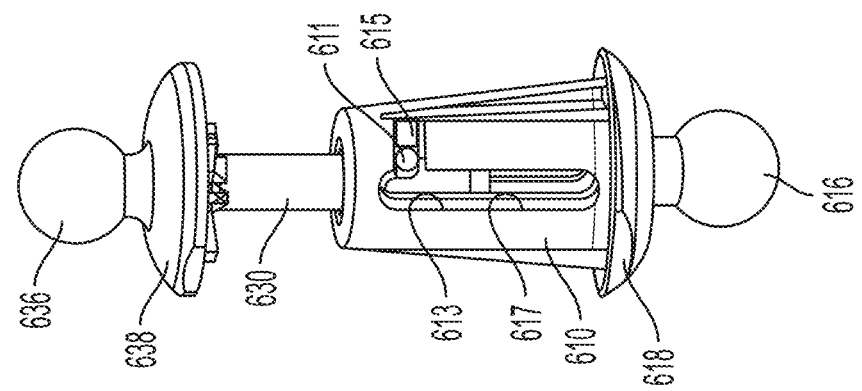
FIG. 16 is a side view of the telescoping spring retainer assembly of FIG. 15 with the spring removed.
Figure 18:
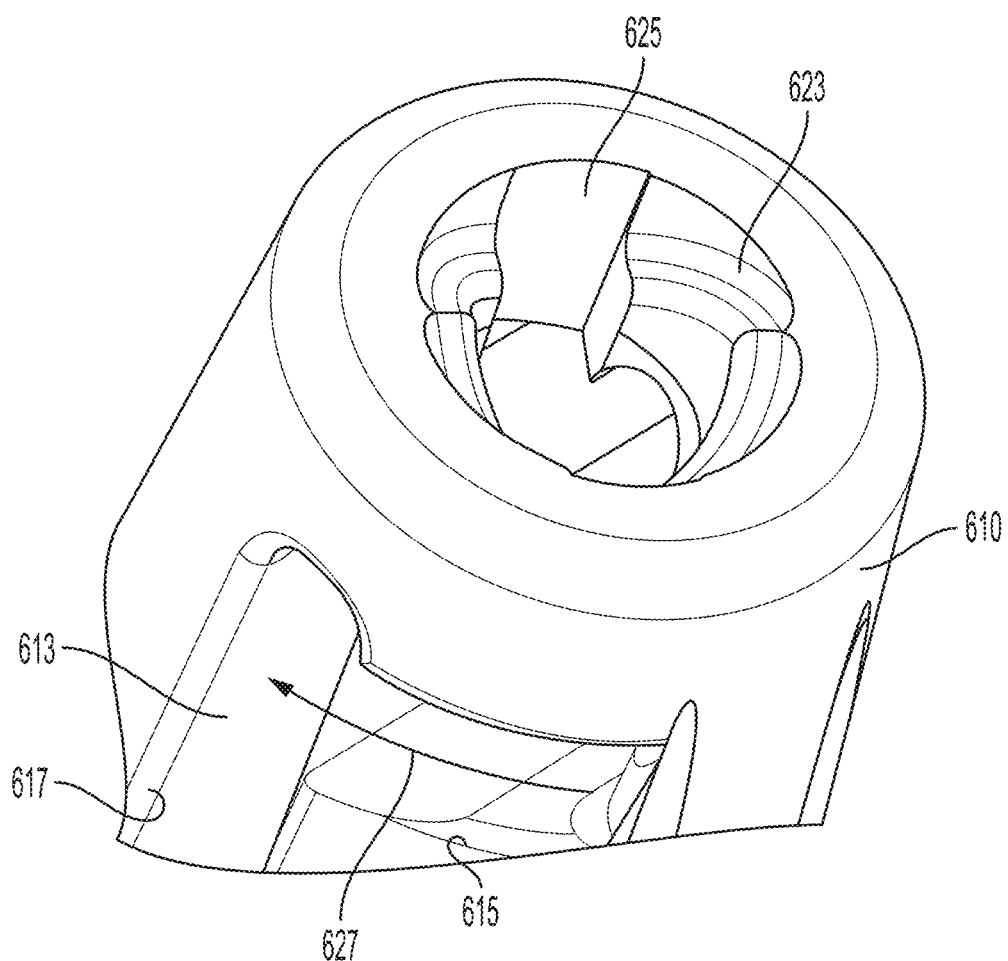
FIG. 18 is a partial perspective view of the cylinder portion of the telescoping spring retainer assembly of FIG. 15.

To assembly the spring retainer assembly 600, the piston portion 630 is pressed into the cylinder portion 610. The cylinder portion 610 has angled internal ramps 623 that guide the buttons 611 into axial grooves 625. The axial grooves 625 guide the buttons 611 in the cross-wise portion 615 of the two-part slot 613 (FIG. 16). Once the buttons 611 are in the slot 613, the piston portion 630 can be rotated along arrow 627 as shown in FIG. 18 to be in the operational position within the axial portion 617 of the slot 613. In another embodiment, the buttons 611 are push-buttons that retract during insertion into the slot 613. In still another embodiment, the slot 613 extends toward the open end (e.g., along the line of the groove 625). The cylinder portion 610 may also be somewhat deformable so that the cylinder portion 610 can be flexed to insert the buttons 611 in the slots.

As can be seen, the subject disclosure provides many improvements to BFP assemblies 100. For example, without limitation, the BFP assemblies 100 are more easily manufactured by simplification and/or reversibility of components. The assembly is not only easier but more error proof due to improved design of components. Similarly, repair is also faster, easier and less complex. Further, the subject technology can be adapted to any kind of valve.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., check valves, valve elements, spring retention assemblies, and the like) shown as distinct for purposes of illustration can be incorporated within other functional elements in a particular implementation.

While the subject technology has been described with respect to various embodiments, those skilled in the art will readily appreciate that various changes and/or modifications can be made to the subject technology without departing from the scope of the present disclosure.

What is claimed is:

1. A valve assembly comprising:
a bias assembly including: an elongated cylinder portion having an open threaded end and a closed end; and an elongated piston portion having a free end and a threaded tab end configured to thread through the open threaded end and, thereby, be slideably captured in the cylinder portion, wherein the closed end and the free end are similarly shaped so that the bias assembly can be reversibly mounted; and
a valve member including a central disc having a first side and a second side, each side forming a sealing region and having a retention cup, wherein both retention cups can capture the closed end or the free end so that the valve member is reversible.

2. A valve assembly as recited in claim 1, wherein the bias assembly includes a spring coupled to the elongated cylinder portion and the piston portion to provide a force to urge the elongated cylinder portion and the piston away from one another.

3. The valve assembly of claim 2, wherein: the cylinder portion has a retention collar; the piston portion has a retention collar; and the spring is helical and extends between the retention collars.

4. The valve assembly of claim 2, wherein the spring is under a predetermined amount of compression less than an amount of force of a forward flow of fluid in a backflow prevention system of which the valve assembly is apart of.

5. The valve assembly of claim 2, wherein: an inner diameter of the cylinder portion and an outer diameter of the captured end are approximately equal so that lateral movement of the piston portion is reduced.

6. The valve assembly of claim 2, wherein the spring is disposed around the cylindrical portion.

7. A valve member for a valve assembly comprising:
a bias assembly including: an elongated cylinder portion having an open threaded end and a closed end; and an elongated piston portion having a free end and a threaded tab end configured to thread through the open threaded end and, thereby, be slideably captured in the cylinder portion, wherein the closed end and the free end are similarly shaped so that the bias assembly can be reversibly mounted; and
a central disc having a first side and a second side, each side thrilling a sealing region and having a retention cup, wherein the sealing regions and the retention cups are similarly shaped so that the valve member is reversible.

8. The valve member of claim 7, wherein the sealing regions are ring-shaped elastomeric inserts.

9. The valve member of claim 7, wherein the retention cups: are centrally located on the respective side; include a plurality of deflectable fingers for receiving a spherical end of a spring retention assembly; and are of a same shape and size.

10. The valve member of claim 9, further comprising a hinge portion extending radially from the central disc, wherein the hinge portion includes a pair of opposing arms extending radially from the central disc and having distal protruding tabs.

11. The valve member of claim 7, wherein the first and second sides are about an axis.

12. A spring retention valve assembly for a valve assembly, comprising:
an elongated cylinder portion having an open end and a closed end;
an elongated piston portion having a free end and a captured end configured to be slideably captured in the cylinder portion;
a spring coupled to the elongated cylinder portion and the piston portion to provide a force to urge the elongated cylinder portion and the piston away from one another; and
a central disc having a first side and second side, each side forming a sealing region and having a retention cup, wherein the sealing regions and the retention cups are similarly shaped so that the central disc is reversible,
wherein the closed end and the free end are similarly shaped so that the spring retention assembly can be reversibly mounted to the central disc.

* * * * *